United States Patent
Shi et al.

(10) Patent No.: US 12,449,310 B2
(45) Date of Patent: Oct. 21, 2025

(54) METHOD AND APPARATUS FOR DETECTING FIRE SPOTS, ELECTRONIC DEVICE, AND STORAGE MEDIUM

(71) Applicant: ZHEJIANG UNIVIEW TECHNOLOGIES CO., LTD., Zhejiang (CN)

(72) Inventors: Fei Shi, Zhejiang (CN); Longhua Mao, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/259,927

(22) PCT Filed: Dec. 8, 2021

(86) PCT No.: PCT/CN2021/136265
§ 371 (c)(1),
(2) Date: Jun. 29, 2023

(87) PCT Pub. No.: WO2022/143052
PCT Pub. Date: Jul. 7, 2022

(65) Prior Publication Data
US 2024/0060822 A1 Feb. 22, 2024

(30) Foreign Application Priority Data
Dec. 29, 2020 (CN) .......................... 202011587808.6

(51) Int. Cl.
*G01J 5/00* (2022.01)
*G01J 5/08* (2022.01)
(Continued)

(52) U.S. Cl.
CPC .......... *G01J 5/0066* (2013.01); *G01J 5/0859* (2013.01); *G06V 10/12* (2022.01); *G06V 20/52* (2022.01);
(Continued)

(58) Field of Classification Search
None
See application file for complete search history.

(56) References Cited

U.S. PATENT DOCUMENTS 5,159,200 A * 10/1992 Dunbar ................. G08B 17/12
250/350
2003/0132847 A1  7/2003 Anderson
(Continued)

FOREIGN PATENT DOCUMENTS

BR  102018017080 A2 *  3/2020
CN      103106766 A1    5/2013
(Continued)

OTHER PUBLICATIONS

International Search Report in Application No. PCT/CN2021/136265, dated Mar. 9, 2022, 4 pages, including translation.
(Continued)

*Primary Examiner* — Stefan Gadomski
(74) *Attorney, Agent, or Firm* — MASCHOFF BRENNAN

(57) ABSTRACT

Provided are a method and an apparatus for detecting fire spots, an electronic device, and a storage medium. In this embodiment of the present application, the target position of a focus lens group is determined based on the minimum object distance and the maximum object distance in a collected image so that collected images based on the target position of the focus lens group can achieve maximum detection clarity. In the detection of a suspected fire spot region, moving the focus lens group from the closest posi-
(Continued)

---

101 — Acquire a to-be-detected image collected by an image collection device based on a focus lens group at a target position, where the target position of the focus motor is determined according to the minimum object distance and the maximum object distance in the to-be-detected image 102 — Move, according to a preset moving rule, a fire spot detection template in the to-be-detected image, and use the range covered by the fire spot detection template as a detection region 103 — Determine, according to the pixel value in the detection region, whether the detection region is a fire spot region tion corresponding to the minimum object distance to the farthest position corresponding to the maximum object distance achieves dimensional movement of the camera lens focus group, which solves the problem of insufficient depth of field of the lens and the inability to cover all fire spots in a multi-object-distance scene.

17 Claims, 4 Drawing Sheets

(51) Int. Cl.
G06V 10/12 (2022.01)
G06V 20/52 (2022.01)
H04N 23/23 (2023.01)
H04N 23/67 (2023.01)
H04N 23/695 (2023.01)

(52) U.S. Cl.
CPC ........... *H04N 23/23* (2023.01); *H04N 23/675* (2023.01); *H04N 23/695* (2023.01); *G01J 2005/0077* (2013.01)

(56) References Cited

U.S. PATENT DOCUMENTS

| | | | | |
|---|---|---|---|---|
| 2003/0214583 A1* | 11/2003 | Sadok | .................. | G08B 17/125 |
| | | | | 348/143 |
| 2004/0061777 A1* | 4/2004 | Sadok | .................. | G08B 17/125 |
| | | | | 348/83 |
| 2005/0069207 A1 | 3/2005 | Zakrzewski et al. | | |
| 2009/0016609 A1 | 1/2009 | Zakrzewski et al. | | |
| 2014/0219556 A1* | 8/2014 | Smirnov | ................ | G06V 10/56 |
| | | | | 382/165 |
| 2017/0353654 A1 | 12/2017 | Kato | | |
| 2019/0297295 A1* | 9/2019 | Roberts | .................. | H04N 25/78 |
| 2019/0371147 A1 | 12/2019 | Zhou et al. | | |

FOREIGN PATENT DOCUMENTS

| | | |
|---|---|---|
| CN | 106341596 A | 1/2017 |
| CN | 107403433 A1 | 11/2017 |
| CN | 108416968 A | 8/2018 |
| CN | 110634260 A | 12/2019 |
| CN | 111368756 A | 7/2020 |
| CN | 111818260 A | 10/2020 |
| JP | 2000137877 A * | 5/2000 |
| JP | 215108918 A | 6/2015 |
| WO | 01057819 A2 | 8/2001 |

OTHER PUBLICATIONS

Extended European Search Report in Application No. 21913793.2, dated Nov. 27, 2024, 9 pages, including translation.
First Office Action in Chinese Application No. 202011587808.6, dated Jan. 3, 2025, 12 pages, including translation.
First Search Report in Chinese Application No. 2020115878086, dated Dec. 27, 2024, 9 pages, including translation.
T. Celik et al., "Fire detection using statistical color model in video sequences", ScienceDirect, J. Vis. Commun. Image R. 18 (2007) 176-185, www.elsevier.com/locate/jvci, doi:10.1016/j.jvcir.2006.12. 003.
Z. Yaping et al., "Study on the smoke detection scheme of the binocular forest fire monitoring system", China New Technology and New Products 2020, No. 4, http://www.cnki.net, DOI:10.13612/ j.cnki.cntp.2020.08,067.

* cited by examiner

METHOD AND APPARATUS FOR DETECTING FIRE SPOTS, ELECTRONIC DEVICE, AND STORAGE MEDIUM

CROSS REFERENCE TO RELATED APPLICATIONS

This is a National Stage Application filed under 35 U.S.C. 371 based on International Patent Application No. PCT/CN2021/136265, filed on Dec. 8, 2021, which claims priority to Chinese Patent Application No. 202011587808.6 filed with the China National Intellectual Property Administration (CNIPA) on Dec. 29, 2020, the disclosures of which are incorporated herein by reference in their entireties.

TECHNICAL FIELD

The present application relates to the technical field of image monitoring, for example, a method and an apparatus for detecting fire spots, an electronic device, and a storage medium.

BACKGROUND

Fire, a common and frequent disaster, features strong suddenness, great destructiveness, and difficulty in handling and rescue, which greatly affects people's life and property safety. Therefore, in monitoring the fire, the timeliness and accuracy of finding fire spots are particularly important, with which relevant personnel can take rescue measures as soon as possible to minimize the loss caused by the fire.

The method for detecting fire spots in related art is as follows: Fire spots can be detected by a thermal imaging pan-tilt camera. The thermal imaging pan-tilt camera is mounted on a monitoring high point so that full coverage of fire spot detection in the monitoring scene can be achieved by a traversal cruise scanning of a monitoring scene. Once a fire spot is detected, the camera immediately gives an alarm to a control center through a network, and meanwhile, position information of the fire spot can be located through the position of the pan-tilt. The control center can quickly identify the fire spot and take measures in the early stage of the fire to avoid greater losses and disasters. To cover a longer monitoring distance, generally, the focal length of a thermal imaging lens used in general forest fire prevention or other large monitoring areas is above 50 mm. According to the principle of lens imaging, the larger the focal length is, the smaller the depth of field is.

When a scene monitored by the camera is a multi-object-distance scene, detection of fire spots may be missed if images are still collected according to the fixed position of a focus lens group during cruise scanning. Specifically, when a fire spot deviates from the effective depth of field of the camera, and the area of the fire spot is small, the heat radiation intensity is insufficient, and the imaging brightness of the camera is not high, which cause missed detection of fire spots.

SUMMARY

Embodiments of the present application provide a method and an apparatus for detecting fire spots, an electronic device, and a storage medium to improve the accuracy of detecting fire spots at multiple object distances.

In a first aspect, an embodiment of the present application provides a method for detecting fire spots. The method includes acquiring a to-be-detected image collected by an image collection device based on a focus lens group at a target position, where the target position of the focus lens group is determined according to the minimum object distance and the maximum object distance in the to-be-detected image; moving, according to a preset moving rule, a fire spot detection template in the to-be-detected image, and using the range covered by the fire spot detection template as a detection region; and determining, according to the pixel value in the detection region, whether the detection region is a fire spot region.

In a second aspect, an embodiment of the present application provides an apparatus for detecting fire spots. The apparatus includes an image acquisition module, a template moving module, and a fire spot determination module.

The image acquisition module is configured to acquire a to-be-detected image collected by an image collection device based on a focus lens group at a target position. The target position of the focus lens group is determined according to the minimum object distance and the maximum object distance in the to-be-detected image.

The template moving module is configured to move, according to a preset moving rule, a fire spot detection template in the to-be-detected image, and use the range covered by the fire spot detection template as a detection region.

The fire spot determination module is configured to determine, according to the pixel value in the detection region, whether the detection region is a fire spot region.

In a third aspect, an embodiment of the present application provides an electronic device. The device includes at least one processor and a storage apparatus.

The storage apparatus is configured to store at least one program.

The at least one program, when executed by the at least one processor, causes the at least one processor to perform the method for detecting fire spots of the first aspect of the present application.

In a fourth aspect, an embodiment of the present application provides non-transitory computer-readable storage medium storing a computer program that, when executed by a processor, performs the method for detecting fire spots of the first aspect of the present application.

DETAILED DESCRIPTION

Hereinafter the present application is described in detail in conjunction with the drawings and embodiments.

Embodiment One

Figure 1:
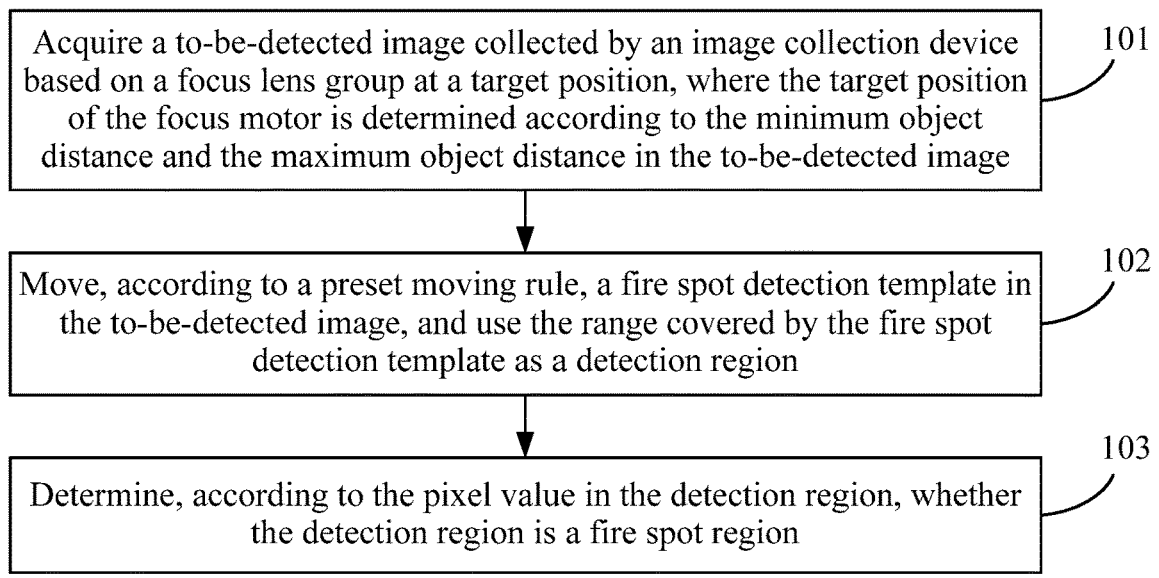
FIG. 1 is a flowchart of a method for detecting fire spots according to embodiment one of the present application.

FIG. 1 is a flowchart of a method for detecting fire spots according to embodiment one of the present application. This embodiment can be applied to fire spot detection in a multi-object-distance scene. The method may be performed by an apparatus for detecting fire spots. The apparatus may be implemented by software and/or hardware and be configured in an electronic device. The electronic device may be, for example, a device with communication and computing capabilities, such as a background server. As shown in FIG. 1, the method includes the steps described below.

Step 101: A to-be-detected image is acquired which is collected by an image collection device based on a focus lens group at a target position. The target position of the focus lens group is determined according to the minimum object distance and the maximum object distance in the to-be-detected image.

The image collection device refers to a camera that can achieve long-distance monitoring. To achieve long-distance monitoring, the camera needs to use a telephoto lens. Based on the imaging principle of the telephoto lens, the telephoto lens inevitably has a problem of small depth of field. In this embodiment of the present application, the image collection device is a thermal imaging pan-tilt camera to improve the accuracy of detecting fire spots. The camera, by rotating the pan-tilt, can perform a traversal cruise scanning on a monitoring scene so that full coverage of the fire spot detection in the monitoring scene can be achieved. To satisfy different monitoring distances in the image collection device, a lens group that can be adjusted in positions is provided in the camera lens. The lens group is called a focus lens group driven by a focus motor to perform a front-to-back adjustment. In this manner, objects at different object distances can be clearly imaged, and when the objects are clearly imaged, the object distance and the position of the focus lens are in a one-to-one correspondence. The object distance refers to the distance between the camera and an observation target. The minimum object distance in the to-be-detected image refers to the closest monitoring distance in the to-be-detected image. The farthest object distance refers to the farthest monitoring distance in the to-be-detected image. According to the law of camera imaging, the minimum object distance refers to the distance between the observation object at the bottom of the to-be-detected image and the camera, and the maximum object distance refers to the distance between the observation object at the top of the to-be-detected image and the camera.

When the image collection device collects an image during cruise scanning, the target position of the focus lens group is determined based on the minimum object distance and the maximum object distance in the collected image, that is, the target position of the focus motor is determined. Exemplarily, the closest position of the focus motor corresponding to the minimum object distance exists if the image collection device is to make a target object with the minimum object distance imaged the clearest. Similarly, the farthest position of the focus motor corresponding to the farthest object distance also exists if the image collection device is to make a target object with the maximum object distance imaged the clearest. When the focus motor is in the closest position, the object at the bottom of the collected image is imaged the clearest, and the farther the distance from the object at the bottom is, the less clear the imaging is. When the focus motor is in the farthest position, the object at the top of the collected image is imaged the clearest, and the farther the distance from the object at the top is, the less clear the imaging is. Therefore, the target position of the focus lens group is determined according to the minimum object distance and the maximum object distance in the to-be-detected image so that objects in the entire image are relatively clearest. To take into account the clarity of the entire image, the target position of the focus lens group is configured to be F during scanning, that is, the target position of the focus motor is determined to be F. F is located between the closest position and the farthest position of the focus motor. Exemplarily, the closest position of the focus motor is $F_N$, the farthest position is $F_F$, and $F=(F_N+F_F)/2$. The clarity of the to-be-detected image within the monitoring range is the best. The configuration of F in this embodiment of the present application is not limited.

Alternatively, when the image collection device performs cruise scanning in the horizontal direction, the minimum object distance and the maximum object distance in a collected image do not change much. However, when the image collection device performs cruise scanning in the vertical direction, the minimum object distance and the maximum object distance in the collected image do change. Therefore, when the lens of the image collection device is detected to change in the vertical direction, the minimum object distance and the maximum object distance in the collected image are determined, and then the target position of the focus lens group is determined. If the lens of the image collection device does not change in the vertical direction, and the image collection device performs cruise scanning and collects images in the horizontal direction, the position of the focus lens group can be kept unchanged. Exemplarily, when it is detected that the pan-tilt rotates in the vertical direction, the target position of the focus lens group that is collecting a to-be-detected image is re-determined according to the minimum object distance and the maximum object distance in the current monitoring image.

In a feasible embodiment, before step 101, the method also includes determining at least two calibration positions of a focus lens group when an object of an image collection device is most clearly imaged at the at least two calibration object distances; and determining, according to the at least two calibration object distances and the at least two calibration positions of the focus lens group, a relationship between an object distance and a position of the focus lens group when an object is most clearly imaged.

Correspondingly, determining the target position of the focus lens group according to the minimum object distance and the maximum object distance in the to-be-detected image includes determining, based on the relationship between the object distance and the position of the focus lens group, the closest position and the farthest position of an associated focus lens group respectively according to the minimum object distance and the maximum object distance in the to-be-detected image; and determining, according to the closest position and the farthest position of the focus lens group, a target position of the focus lens group.

The calibration distance is determined according to the monitoring range. At least two object distances are selected from the monitoring range as the calibration object distances. The number and range of the calibration object distances are configured according to the accuracy required for monitoring and the monitoring range used, which are not limited herein. Exemplarily, with a monitoring range of 10 m to 50 m, the calibration distance may be configured to be 10 m, 20 m, 30 m, 40 m, and 50 m.

The position of the focus lens group when an object is imaged the clearest under at least two selected calibration object distances is measured and determined as the calibration position. Based on that, a corresponding relationship between the calibration object distance and the calibration position is established. Due to the imaging principle of the camera, the object distance and the position of the clear point focus lens group are in a nonlinear relationship. Therefore, a respective position of the focus lens group corresponding to each object distance can be obtained by performing piecewise interpolation according to the calibration object distance and the calibration position.

When the image collection device needs to determine the target position of the focus lens group, the closest position of the focus lens group corresponding to the minimum object distance in a collected image and the farthest position of the focus lens group corresponding to the maximum object distance are determined according to the piecewise interpolation result, thereby determining the target position of the focus lens group. Exemplarily, after obtaining the minimum object distance, two calibration object distances are determined between which the minimum object distance is located, and then nonlinear interpolation is performed on the positions of the focus motor corresponding to the two calibration object distances to obtain the target position of the focus motor.

The relationship between the object distance and the position of the focus motor is pre-calibrated so that the target position of the focus motor corresponding to a currently collected image can be quickly determined in the process of cruise scanning and collecting images, thereby improving the efficiency of image collection. In this manner, the time-consuming determination of the position of the focus motor in real time is avoided during collection.

In a feasible embodiment, the scanning path of the image collection device to collect images includes at least two scanning inflection points. A lens of the image collection device is rotated in the vertical direction at each scanning inflection point.

The method for detecting fire spots also includes acquiring a pre-scanned image after the image collection device is rotated in the vertical direction at the each scanning inflection point; and determining, according to the minimum object distance and the maximum object distance in the pre-scanned image, the closest position and the farthest position of the focus lens group when an object is clearly imaged, and establishing the association relationship between the each scanning inflection point and the closest position and the farthest position of the focus lens group.

Correspondingly, determining the target position of the focus lens group according to the minimum object distance and the maximum object distance in the to-be-detected image includes determining a currently experienced scanning inflection point of the image collection device; determining, based on the association relationship between the each scanning inflection point of the at least two scanning inflection points and the closest position and the farthest position of the focus lens group, a current closest position and a current farthest position of the focus lens group according to the currently experienced scanning inflection point; and determining, according to the current closest position and the current farthest position, a target position of the focus lens group.

Figure 2:
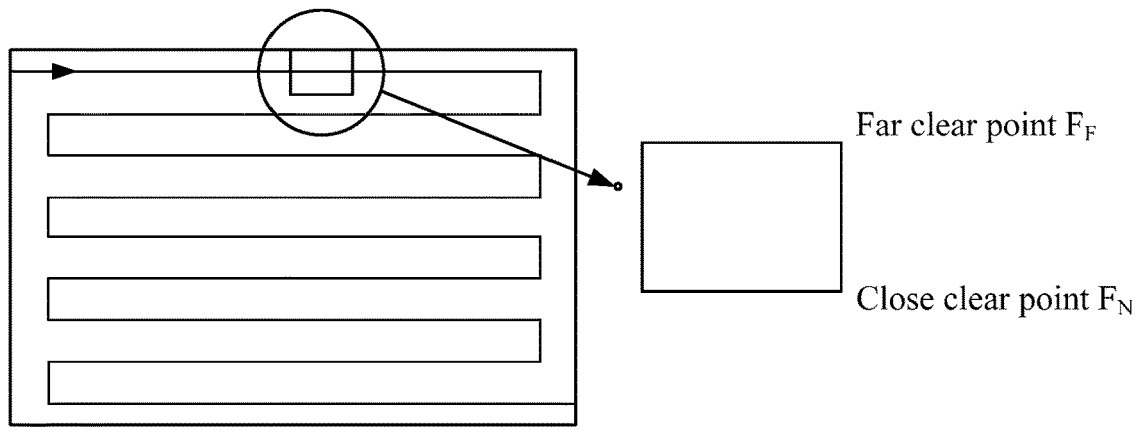
FIG. 2 is a diagram of an S-shaped scanning path.

The image collection device performs cruise scanning according to a pre-planned scanning path and collects images in the scanning process. The pre-planned scanning path is based on the delineated range of a monitoring region. Through reasonable planning, the monitoring region can be fully covered after the scanning is completed. The planning of the scanning path needs to be determined according to an angle of the monitoring region and the field of view angle of the current image collection device to ensure no repetition or omission. To minimize the scanning path of the image collection device and meanwhile, ensure full coverage of the monitoring region, the scanning path is generally planned to be S-shaped, as shown in FIG. 2. FIG. 2 is a diagram of an S-shaped scanning path. When an image is being collected according to this scanning path, scanning in the horizontal direction and in the vertical direction exists. During scanning, the closest position of the focus lens group corresponding to the minimum object distance in the collected image is a close clear point $F_N$, and the farthest position of the focus lens group corresponding to the maximum object distance is a far clear point $F_F$. $F_N$ and $F_F$ in each image collected in the horizontal scanning process in the scanning path remain unchanged. $F_N$ and $F_F$ in an image collected in the vertical scanning process in the scanning path changes.

Therefore, the following steps are performed to improve the efficiency of determining the close clear point and the far clear point of a collected image at each scanning point in the subsequent scanning process. After the scanning path is planned, the image collection device is controlled to perform pre-scanning in the vertical direction to acquire a pre-scanned image at each scanning inflection point on the vertical scanning path, autofocus is performed on the minimum object distance and the maximum object distance in each pre-scanned image, $F_N$ and $F_F$ in each pre-scanned image are sequentially recorded, and the association relationship between the vertical direction of each scanning inflection point and the closest position $F_N$ and the farthest position $F_F$ of the focus lens group is established. Exemplarily, a mapping relationship between the vertical rotation direction of the pan-tilt and $F_N$ and $F_F$ is established.

In the formal scanning process, a currently experienced scanning inflection point of the image collection device is determined, that is, the current vertical direction of the image collection device is determined. The current closest position and the current farthest position associated with the current vertical direction are determined according to the association relationship between the vertical direction and the closest position $F_N$ and the farthest position $F_F$ of the focus lens group, and the target position of the focus lens group is determined according to the current closest position and the current farthest position. Exemplarily, if the average value of the closest position and the farthest position in a scanned image is used as the target position, the associated relationship between the vertical direction and the target position can be directly established, that is, the current target position can be directly determined according to the current vertical direction in the formal scanning process, thereby improving the image collection efficiency.

Alternatively, the vertical direction of the image collection device is monitored, and if no change in the vertical direction is detected, the current target position of the focus lens group is kept unchanged; if a change in the vertical direction is detected, the target position of the corresponding focus lens group needs to be re-determined according to the current vertical direction, that is, the vertical direction in which an image is collected is determined, and the current target position is updated.

In the cruise scheme in the related art, autofocus is generally performed once at each scanning inflection point so that the overall picture is clear. However, the clarity of each local region cannot be quantitatively determined. That is, it is impossible to ensure that the position of the focus lens group during autofocus ensures the highest degree of local clarity in the entire image. Therefore, the target position of the focus lens group in this embodiment of the present application is determined according to the minimum object distance and the maximum object distance in the collected image. In this manner, the clarity of both the global image and the local region is guaranteed, and the accuracy of detecting fire spots is improved.

Step 102: According to a preset moving rule, a fire spot detection template is moved in the to-be-detected image, and the range covered by the fire spot detection template is used as a detection region.

Figure 3:
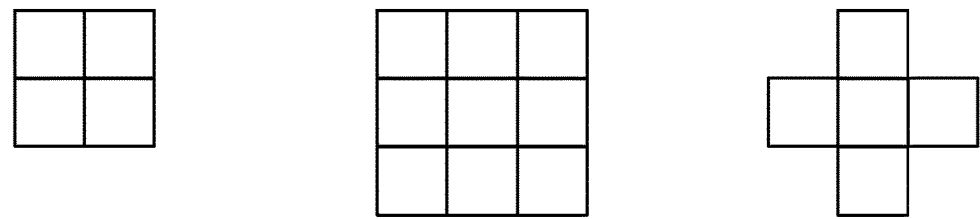
FIG. 3 is a diagram of a fire spot detection template.

The fire spot detection template refers to a region template for positioning the fire spot position and can be determined according to the accuracy of the fire spot detection, which is not limited herein. Exemplarily, FIG. 3 is a diagram of a fire spot detection template. The three types of fire spot detection templates illustrated in FIG. 3 are merely a few examples. The fire spot detection template is not limited to the three types. For example, a fire spot detection template of type a is used in this embodiment of the present application, that is, a moving traversal search is performed in a to-be-detected image by a fire spot detection template of four pixels. The preset moving rule is used to configure the moving step and the moving direction of the fire spot detection template in the to-be-detected image. The moving step can be configured according to the size of the fire spot detection template, which is not limited herein.

Exemplarily, fire spot detection is performed on each frame of image collected in the cruise scanning by the image collection device. After each frame of image is collected, a fire spot detection template is used for sequentially moving and traversing the to-be-detected image, and each detection region covered in the moving and traversing process of the fire spot detection template is determined. The moving step of the fire spot detection template may also be configured according to practical needs, which is not limited herein.

Step 103: According to the pixel value in the detection region, whether the detection region is a fire spot region is determined.

The image collection device is a thermal imaging camera that captures infrared light of object radiation by using an infrared detector and then presents an image of the object according to the magnitude of the intensity of the infrared radiation. A grayscale image is used as an example. The higher the pixel value is, the stronger the infrared radiation of the point is, and the higher the temperature is. Therefore, whether the temperature in the detection region is too high or not can be determined according to the pixel value in the detection region. In the case where the temperature in the detection region is too high, it is determined that the detection region is a fire spot region. Exemplarily, an average pixel value in each detection region is determined, and whether the detection region is a fire spot region is determined according to a comparison result between the average pixel value and a predetermined fire spot detection threshold. The fire spot detection threshold may be determined according to the actual temperature of a fire spot. Determination by the average pixel value of multiple pixel points in the detection region can reduce the interference of random noise of a single pixel point and improve the accuracy of detecting fire spots.

In a feasible embodiment, before step 103, the method also includes acquiring a simulated image collected by the image collection device for a simulated fire spot based on the focus lens group at a simulated position, and determining the pixel value of a simulated fire spot region in which the simulated fire spot in the simulated image is located, where the simulated position of the focus lens group is determined according to an object distance between the simulated fire spot and the image collection device; determining the pixel value of a non-simulated fire spot region in the simulated image; and determining, according to the pixel value of the simulated fire spot region and the pixel value of the non-simulated fire spot region, a first fire spot detection threshold and a second fire spot detection threshold. The pixel value of the simulated fire spot region is greater than the first fire spot detection threshold. The first fire spot detection threshold is greater than the second fire spot detection threshold. The second fire spot detection threshold is greater than the pixel value of the non-simulated fire spot region.

The simulated fire spot is a selected fire source for a simulated test of a real fire spot. For example, the simulated fire spot may be an alcohol lamp or another easily controllable fire source. The simulated fire spot is actually tested to calibrate the fire spot detection threshold in advance so that the determined fire spot detection threshold is closer to the real fire spot, improving the accuracy of the fire spot detection.

Exemplarily, the simulated fire spot is placed in an effective detection region of the image collection device, for example, placed at a position where the object distance from the image collection device is D. According to the working principle of the thermal imaging camera, the grayscale value of an image collected by the thermal imaging camera is related to the temperature of an object being photographed and to the object distance between the object and the camera. However, in fields where the monitoring distance is long such as forest fire prevention, the influence of distance on the grayscale value of an image collected can be ignored. The detection threshold for determining fire spots depends on the difference between the fire spot temperature and the ambient temperature. Therefore, the value of the object distance D is not limited.

The simulated fire spot is placed at a position where the object distance from the image collection device is D, and the position of the focus lens group is adjusted by adjustment of the position of the focus motor of the image collection device so that the fire spot is clearly imaged in the image collection device. Exemplarily, the simulated fire spot is clearly imaged by performing regional autofocus on the simulated fire spot region. The simulated fire spot region in which the simulated fire spot is located is determined according to a fire spot detection template in a simulated image in which the simulated fire spot is clearly imaged. Then, the pixel value of the simulated fire spot region and the pixel value of a non-simulated fire spot region are determined. Exemplarily, the average pixel value of the simulated fire spot region is used as the average pixel value of a real fire spot region. The average pixel value of the non-simulated fire spot region is used as the average pixel value of a real non-fire spot region. Since the simulated fire spot is artificially placed, it can be determined that the simulated fire spot region is a real fire spot, which can reflect the pixel value level of the real fire spot region. It can also be determined that the non-simulated fire spot region has no fire spots. Therefore, the pixel value of the non-simulated fire spot region can reflect the pixel value level of the background. The pixel value of the simulated fire spot region is denoted as $I_{fire}$. The pixel value of the non-simulated fire spot region is denoted as $I_b$.

According to the imaging principle of the camera, when the simulated fire spot is most clearly imaged on an imaging surface, the pixel value of the simulated fire spot region is the maximum. When the position of the focus lens group deviates from the position corresponding to a clear point, the imaging of the simulated fire spot starts to diverge, and the pixel value of the simulated fire spot region starts to decrease. The pixel value of the simulated fire spot region gradually decreases to the same level as $I_b$ of the background of the non-fire spot region as the position of the focus lens group deviates farther from the clear point. Therefore, the first fire spot detection threshold $I_1$ and the second fire spot detection threshold $I_2$ are determined between the pixel value $I_{fire}$ of the simulated fire spot region and the pixel value $I_b$ of the non-simulated fire spot region such that $I_{fire} > I_1 > I_2 > I_b$. The fire spot detection threshold needs to be obviously distinctive from that of the background region to reduce misjudgment as much as possible. Therefore, two fire spot detection thresholds are configured. The first fire spot detection threshold is closest to the pixel value of the simulated fire spot region so that accurate determination of the fire spot region is achieved. Meanwhile, in a to-be-detected image captured by the focus lens group in the target position, not all fire spots can be imaged clearly at all object distances. Therefore, the second fire spot detection threshold greater than the pixel value of the non-simulated fire spot region and smaller than the first fire spot detection threshold is configured to avoid missed detection of non-most clearly imaged fire spots. Exemplarily, the following formula is used to determine the first fire spot detection threshold and the second fire spot detection threshold: $I_1 = 0.1*I_b + 0.9*I_{fire}$; $I_2 = 0.9*I_b + 0.1*I_{fire}$. However, this embodiment of the present application does not limit the configuration of the fire spot detection threshold.

In a feasible embodiment, step 103 includes determining that the detection region is a fire spot region in the case where the pixel value in the detection region is greater than or equal to the first fire spot detection threshold; and determining that the detection region is not a fire spot region in the case where the pixel value in the detection region is less than the second fire spot detection threshold.

Since the first fire spot detection threshold is close to the pixel value of a simulated fire spot region, the detection region can be considered as a fire spot region if the pixel value in the detection region in a to-be-detected image is greater than or equal to the first fire spot detection threshold. Since the second fire spot detection threshold is close to the pixel value of a non-simulated fire spot region, it is determined that the detection region is not a fire spot region and is closer to the background region if the pixel value in the detection region in the to-be-detected image is smaller than the second fire spot detection threshold.

Exemplarily, it is determined that the detection region is a fire spot region in the case where the average pixel value in the detection region is greater than or equal to the first fire spot detection threshold; it is determined that the detection region is not a fire spot region in the case where the average pixel value in the detection region is less than the second fire spot detection threshold.

In a feasible embodiment, step 103 also includes determining that the detection region is a suspected fire spot region in the case where the pixel value in the detection region is less than the first fire spot detection threshold and greater than equal to the second fire spot detection threshold; and performing a second detection on the suspected fire spot region to obtain a fire spot region in the suspected fire spot region.

Fire spots with multiple object distances exist in a to-be-detected image, but the fire spots with multiple object distances are not imaged the clearest on the same image. Therefore, to avoid missing detection of the fire spots, if the pixel value in the detection region is between the first fire spot detection threshold and the second fire spot detection threshold, it is determined that the detection region is a suspected fire spot region. The suspected fire spot region may be formed by some sunlight reflection, may be a high-temperature object, or may be a real fire spot. However, since the suspected fire spot region is beyond the effective depth of field of current imaging, the suspected fire spot is more divergent through the imaging of the lens on the image, resulting in a lower pixel value in the suspected fire spot region, which does not meet the determination condition of being greater than or equal to the first fire spot detection threshold. Therefore, in this embodiment, a second detection is performed on the suspected fire spot region to ensure the accuracy of fire spot detection and avoid false detection and missed detection.

After the detection of the detection region in the entire image to be detected is completed, the next frame of image is scanned if a fire spot region and a suspected fire spot region are not found. If a suspected fire spot region is found, a second detection is performed according to the number of the suspected fire spot regions.

In a feasible embodiment, performing a second detection on the suspected fire spot region to obtain a fire spot region in the suspected fire spot region includes determining the closest position of the focus lens group associated with the minimum object distance and the farthest position of the focus lens group associated with the maximum object distance in the to-be-detected image, moving the focus lens group from the closest position to the farthest position, collecting at least two images in a moving process, and determining that the target suspected fire spot region is a fire spot region in the case where a pixel value of a target suspected fire spot region in any one image of the at least two images is greater than or equal to the first fire spot detection threshold. It should be noted that the number of suspected fire spot regions is at least one, and the target suspected fire spot region of the present application is any suspected fire spot region in the at least one suspected fire spot region.

In this embodiment of the present application, when detecting a suspected fire spot region with multiple object distances in the same image is needed, the focus lens group is moved from the closest position associated with the minimum object distance to the farthest position in the image, and multiple images are collected in the moving process. Then any suspected fire spot region in the multiple images has a corresponding image to make the suspected fire spot region imaged relatively clearly. Therefore, it is determined that the suspected fire spot region is a fire spot region if the pixel value of any suspected fire spot region in any image is greater than or equal to the first fire spot detection threshold. It is determined that the suspected fire spot region is not a fire spot region if the pixel value of a suspected fire spot region in all images is less than the first fire spot detection threshold. Exemplarily, the focus motor can move according to the preset step when controlling the position movement of the focus lens group. One frame of image is collected every time the focus motor moves a step. In terms of comparing the pixel value of the corresponding suspected fire spot region in each frame of image and the first fire spot detection threshold, it is determined that the target suspected fire spot region is a fire spot region if the pixel value of the suspected fire spot region is greater than the first fire spot detection threshold. The configuration of the preset step may be determined according to the object distance range and the field depth value in an image collected by the image collection device, which is not limited herein.

After the second detection of the suspected fire spot region is completed, the next frame of image is directly corrected and detected if no fire spot region is found in the to-be-detected image; the position information of all the fire spot regions is determined if a fire spot region is found in the to-be-detected image, including a fire spot region determined from the suspected fire spot region.

In a feasible embodiment, performing a second detection on the suspected fire spot region to obtain a fire spot region in the suspected fire spot region includes determining the number of the suspected fire spot regions in the to-be-detected image; and in the case where the number of the suspected fire spot regions is one, performing regional autofocus on the one suspected fire spot region, and determining the focus pixel value of the one suspected fire spot region in a focused image, and in the case where the focus pixel value is greater than equal to the first fire spot detection threshold, determining that the suspected fire spot region is a fire spot region.

If it is determined that one suspected fire spot region exists after the traversal of the image to-be-detected is completed, a second detection is performed where the focus lens group is moved from the closest position to the farthest position, which causes slow focusing efficiency. Therefore, when one suspected fire spot region exists in the to-be-detected image, regional autofocus is directly performed on the region so that the suspected fire spot region is most clearly imaged. The focus pixel value of the suspected fire spot region after focusing is recalculated. If the focus pixel value is greater than or equal to the first fire spot detection threshold, it is determined that the suspected fire spot region is a fire spot region. If the focus pixel value is less than the first fire spot detection threshold, it is determined that the suspected fire spot region is not a fire spot region. Exemplarily, the suspected fire spot region is determined according to a fire spot detection template, so the suspected fire spot region occupies fewer pixels. Before autofocus, the suspected fire spot region is expanded outward to a region of interest with the suspected fire spot region as the center, and after regional autofocus is performed on the region of interest, the focus pixel value of the suspected fire spot region in the region of interest is determined. The size of the region of interest can be determined according to the actual focusing effect, which is not limited herein.

Since one suspected fire spot region exists in the to-be-detected image, if the suspected fire spot region is caused by a real fire spot, the pixel value of the suspected fire spot region is close to that of the simulated fire spot region after autofocus is performed on the suspected fire spot region. Therefore, directly comparing the pixel value of the suspected fire spot region with that of the first fire spot detection can improve the accuracy of detecting fire spots.

On this basis, if it is determined that at least two suspected fire spot regions exist after the traversal of the to-be-detected image is completed, it indicates that the at least two suspected fire spot regions are at different object distances. Therefore, if autofocus is directly performed on one of the suspected fire spot regions, the remaining suspected fire spot region may still have a pixel value smaller than the pixel value of the first fire spot detection after focusing. Therefore, when a second detection is performed on at least two suspected fire spot regions in the to-be-detected image, the closest position of the focus lens group associated with the minimum object distance and the farthest position of the focus lens group associated with the maximum object distance in the to-be-detected image are determined. The focus lens group is moved from the closest position to the farthest position. At least two images in a moving process are collected. It is determined that the target suspected fire spot region is a fire spot region in the case where the pixel value of a target suspected fire spot region in any one image of the at least two images is greater than or equal to the first fire spot detection threshold.

The second detection of a suspected fire spot region needs to be determined according to the number of the suspected fire spot regions in the to-be-detected image. Since a different number indicates that the object distance of a target object to be detected in the image is also different, a targeted second detection can improve the detection efficiency.

In a feasible embodiment, the method also includes moving a position of the focus lens group to determine a first position and a second position of the focus lens group when the pixel value of the simulated fire spot region is the second fire spot detection threshold on a pixel value attenuation path in a moving process; determining, according to the first position and the second position of the focus lens group, a first object distance and a second object distance; determining, according to the first object distance and the second object distance, an object distance range of actual detection for detecting a fire spot in an image collected by the image collection device; and determining, according to the object distance range of actual detection, a scanning path of the image collection device to collect images.

Figure 4:
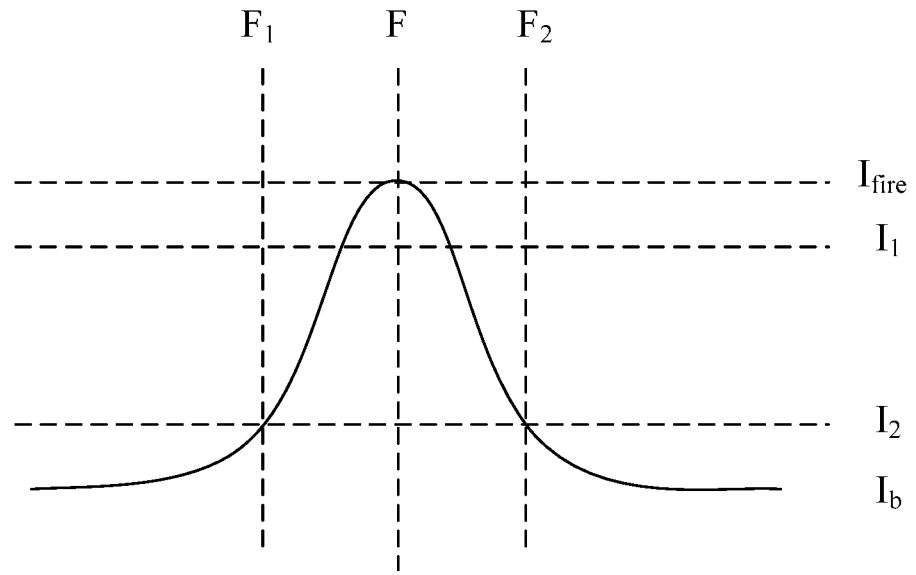
FIG. 4 is a diagram illustrating the pixel value attenuation in the vicinity of a simulated fire spot region at an imaging clear point.
Figure 5:
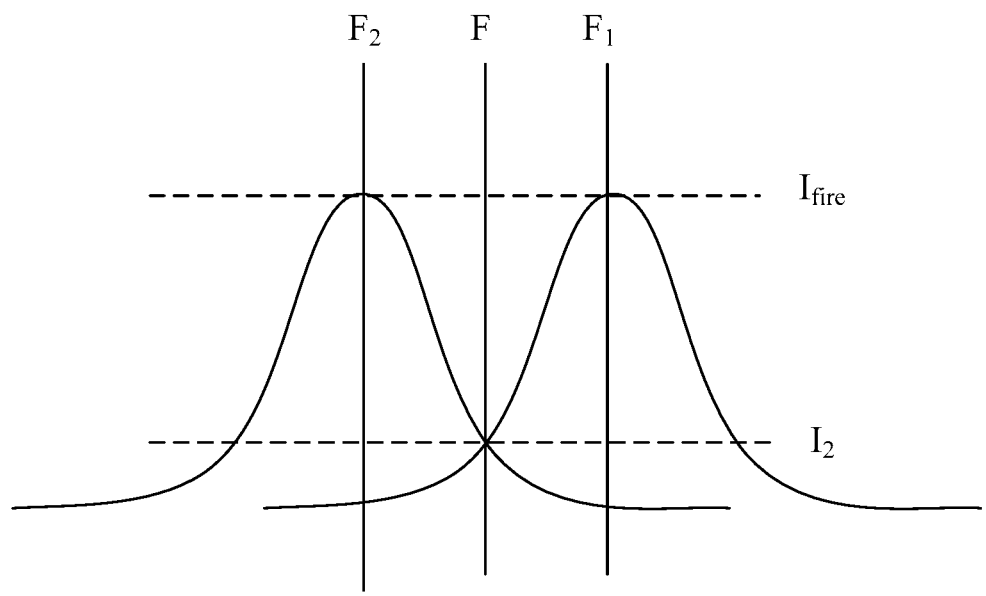
FIG. 5 is a diagram illustrating the actual detection range of a suspected fire spot region.

When the simulated fire spot is tested, one position of a focal clear point corresponding to the object distance of the simulated fire spot region exists. When the clear point deviates, the pixel value of the simulated fire spot region gradually decreases. FIG. 4 is a diagram illustrating the pixel value attenuation in the vicinity of a simulated fire spot region at an imaging clear point. In FIG. 4, F denotes the position of the focus lens group when the simulated fire spot is imaged the clearest on an imaging surface. In FIG. 4, when the focus lens group is located at F, the pixel value of the simulated fire spot region on the simulated image is the $I_{fire}$, and the pixel value of the non-simulated fire spot region is the $I_b$. The values of $I_1$ and $I_2$ are determined between the $I_{fire}$ and the $I_b$. After the second fire spot detection threshold is determined, a respective position (namely, $F_1$ and $F_2$) of the focus lens group exists on the far and close sides of the clear point F so that the pixel value of the simulated fire spot region is $I_2$. If the position of the focus lens group is configured to be F when a current simulated image is collected while the position of the focus lens group corresponding to the object distance of the actual simulated fire spot should be $F_1$ or $F_2$, it can be seen that when the position of the focus lens group is between $F_1$ and $F_2$, and the pixel value obtained by detection of the simulated fire spot region in the simulated image is greater than the second fire spot detection threshold, it can be determined that the simulated fire spot region is a suspected fire spot region. Exemplarily, when a second detection is performed on the suspected fire spot region, a step-by-step search is performed by movement of the position of the focus lens group, as shown in FIG. 5. FIG. 5 is a diagram illustrating the actual detection range of a suspected fire spot region. It can be determined from FIG. 4 that when the focus lens group is located at $F_1$ or $F_2$, the suspected fire spot region at the object distance corresponding to the clear point can be detected, and the pixel value of the suspected fire spot region satisfies a condition of being greater than the first fire spot detection threshold.

Therefore, after the second fire spot detection threshold is determined, the positions $F_1$ and $F_2$ of the focus lens group corresponding to the fire spot that can be detected in the simulated image can be determined. According to the relationship between the calibration object distance and the focus lens group, the object distances $D_1$ and $D_2$ corresponding to $F_1$ and $F_2$ can be determined, that is, the range between $D_1$ and $D_2$ in the to-be-detected image is the object distance range of actual detection of a single scanning. If a real fire spot is located outside the object distance range, the pixel value of the real fire spot is smaller than the second fire spot detection threshold, which causes a missed detection.

Therefore, if the range between $F_N$ and $F_F$ in a to-be-detected image collected by the image collection device is greater than the range between $F_1$ and $F_2$, and no overlapping part of the image is configured in a cruise scanning path, a missed detection of a suspected fire spot is caused. In this embodiment of the present application, the overlapping range of a collected image is configured according to the object distance range of actual detection so that full coverage of a monitoring region can be achieved during scanning according to the object distance range of actual detection.

In this embodiment of the present application, a target position of the focus lens group is determined based on the minimum object distance and the maximum object distance in a collected image, and a to-be-detected image is collected based on the target position. A detection region is determined by a result of movement of a fire spot detection template in the to-be-detected image, and whether the detection region is a fire spot region is determined based on the pixel value of the detection region. The target position of the focus lens group is determined according to the object distance in the collected image so that using the focus lens group at the target position can achieve maximum detection clarity under the current object distance, thereby ensuring that in a multi-object-distance scene, fire spots with multiple object distances in the scene image can be detected, and the accuracy of fire spot detection is improved.

Embodiment Two

Figure 6:
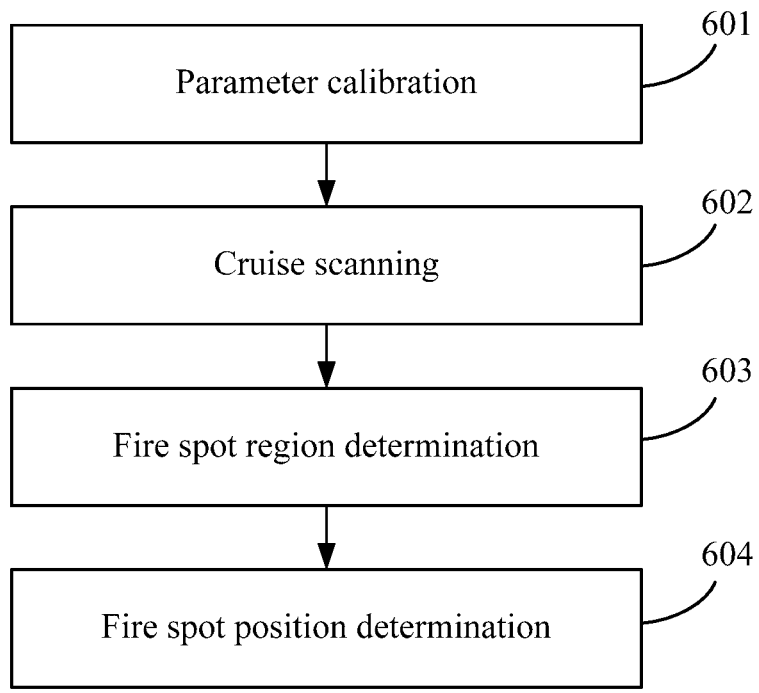
FIG. 6 is a flowchart of a method for detecting fire spots according to embodiment two of the present application.

FIG. 6 is a flowchart of a method for detecting fire spots according to embodiment two of the present application. The embodiment two is an optional embodiment of the present application. As shown in FIG. 6, the method includes the steps described below.

This embodiment of the present application includes a thermal imaging pan-tilt camera and supporting network facilities. The thermal imaging pan-tilt camera adopts a medium-telephoto thermal imaging lens that has a precise focusing function so that objects with different object distances can be clearly imaged by adjustment of the position of the focus lens group.

Step 601: Parameter Calibration

Parameter calibration refers to calibration of parameter information in the fire spot detection process by the thermal imaging camera. The parameters to be calibrated include the relationship between an object distance and a position of the focus motor. To achieve long-distance monitoring, a telephoto lens is needed, which inevitably has a problem of small depth of field. To satisfy different monitoring distances, a lens group that can be adjusted is provided in the camera lens, which is called a focus lens group. The lens group is driven by a focus motor to perform a front-to-back adjustment. In this manner, objects at different object distances can be clearly imaged. An object distance and a focal clear point are in a one-to-one correspondence. The relationship between an object distance and a position of the focus motor can be determined by measurement of positions of the focus motor corresponding to clear points at different object distances. The number of groups and range of the calibration object distances are configured according to the accuracy required by the detection and the monitoring range used. When a position of the focus motor corresponding to a non-calibration object distance is determined, piecewise interpolation is adopted by using data in the calibration object distances.

The parameters to be calibrated also include a fire spot detection threshold including a first fire spot detection threshold and a second fire spot detection threshold. According to the working principle of a thermal imaging camera, the grayscale value of an image collected by the thermal imaging camera is related to the temperature of an object being photographed and to the distance between the object and the camera. However, in the field of forest fire prevention where monitoring distance is relatively long, the influence of distance on the grayscale value of an image collected can be ignored. The fire spot detection threshold depends on the difference between the temperature of a fire spot region and the ambient temperature of surrounding background, which can generally be given by measurement.

A simulated fire spot is used for a test. The simulated fire spot may be an alcohol lamp or another fire source. The simulated fire spot is placed at a position where the object distance from the camera is D. The position of the focus motor of the camera is adjusted so that the simulated fire spot is clearly imaged in the camera. Based on a fire spot detection template, the average grayscale of a simulated fire spot region is calculated and recorded as the $I_{fire}$. Meanwhile, the average grayscale $I_b$ of a non-simulated fire spot region in the background is calculated. According to the imaging principle of the camera, the grayscale value of the fire spot region is the maximum when the fire spot is clearly imaged on an imaging surface. When the position of the focus motor deviates from an imaging clear point, the imaging starts to diverge, and the grayscale of the image starts to decrease. As the position of the focus motor deviates farther from the clear point, the grayscale value of the fire spot region gradually decreases to the same level as $I_b$ of the background. Therefore, the first fire spot detection threshold $I_1$ and the second fire spot detection threshold $I_2$ are selected between $I_{fire}$ and $I_b$ to ensure that $I_{fire} > I_1 > I_2 > I_b$.

Step 602: Cruise Scanning.

After a scanning path is planned, a pan-tilt is controlled to perform pre-scanning in the vertical direction for one round and is controlled to focus clearly on the upper edge and the lower edge of an image corresponding to each formal scanning path. The values of $F_F$ and $F_N$ of each round of scanning are sequentially recorded. In formal scanning, the target position of the focus motor in capturing images can be determined according to $F_F$ and $F_N$.

In each scanning, the farthest and closest monitoring object distances in a currently captured image are first determined. According to the law of camera imaging, the farthest end is generally at the top of the image and the closest end is generally at the bottom of the image, which are denoted as $D_F$ and $D_N$, respectively. According to the relationship between the calibration object distance and the position of the focus motor, the positions $F_F$ and $F_N$ of the focus motor corresponding to the two monitoring distances can be obtained. Alternatively, the two monitoring distances can be directly determined by the position values of the focus motor obtained by pre-scanning. To take into account the clarity of the entire image, the position of the focus motor is configured to be F during scanning. F is between $F_F$ and $F_N$. When $F=(F_F+F_N)/2$, the monitoring range is the widest, and the effect is the best. However, this embodiment of the present application does not limit the configuration method of F. When the pan-tilt rotates in the horizontal direction, the monitoring distance generally does not change. When the pan-tilt rotates in the vertical direction, the monitoring distance does change, and the position F of the focus motor during scanning needs to be re-determined according to the current monitoring object distance.

Step 603: Fire Spot Region Determination

During cruise scanning, a fire spot determination is performed on each frame of image captured by the camera. The process is divided into two steps, namely, a first round of determination and a confirmation of suspected fire spots. The first round of determination is as follows: a traversal search is performed by using a fire spot detection template of four pixels, the average grayscale value $I_{avg}$ of all pixels in the template is calculated, and a fire spot is determined by using the average grayscale value. In this manner, interference of random noise of a single pixel can be reduced. If the average grayscale value $I_{avg}$ of the current region is greater than the first fire spot detection threshold $I_1$, the current region is considered to be a fire spot region. If the average grayscale is less than $I_1$ but greater than or equal to the second fire spot detection threshold $I_2$, the current region is considered to be a suspected fire spot region. After the entire image is searched, the next frame of image is scanned if a fire spot region and a suspected fire spot region are not found. If a suspected fire spot region is found, a confirmation of the suspected fire spot region is executed. A suspected fire spot may be formed by some sunlight reflection, may be a high-temperature object, or may be a real fire spot. However, since the fire spot is beyond the effective depth of field of current imaging, the fire spot is more divergent through the imaging of the lens on the image, resulting in a lower average grayscale value and an inability to meet the determination condition of the first fire spot detection threshold. Therefore, in this embodiment the authenticity of the suspected fire spot is confirmed. Two processing methods are provided according to the number of suspected fire spots in the entire image. If found, the suspected fire spot is extended outward to a region of interest on which regional autofocus is performed so that the suspected fire spot is imaged the most clearly. The average grayscale value of the suspected fire spot is recalculated. If the grayscale value of the suspected fire spot is greater than or equal to $I_1$, the suspected fire spot is considered to be a fire spot region. If the grayscale value of the suspected fire spot is less than $I_1$, the suspected fire spot is considered to be a non-fire spot region. If multiple suspected fire spot regions are found, the focus motor of the lens is placed at $F_N$ of the image and then moved to $F_F$ with a fixed step. Each time the focus motor moves one step, the camera collects a frame of image, and the first fire spot detection threshold is used to determine a fire spot by comparing the grayscale of the suspected fire spot region in the image. When the focus motor moves to $F_F$, the confirmation of suspected fire spots ends. In this process, the numbers of fire spot regions and non-fire spot regions in the suspected fire spot region are counted. If non-fire spot regions exist in the suspected fire spot region and no fire spot region is found in the first round of determination, the cruise scanning is continued. If a fire spot region is found in the final result, fire spot position confirmation is performed.

Step 604: Fire Spot Position Determination

Figure 7:
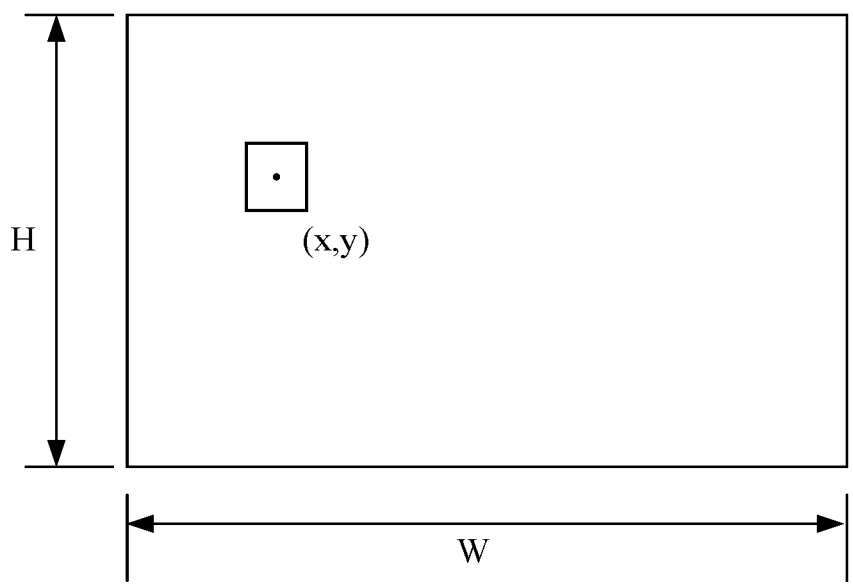
FIG. 7 is a diagram in which the position of a fire spot region is determined in an image.

When a frames of image is collected where a fire spot region is located, a horizontal angle P of the pan-tilt, a field of view angle α of the frame of image, and the position (x, y) of the fire spot region in the image are determined. FIG. 7 is a diagram in which the position of a fire spot region is determined in an image. The pan-tilt angle on the left edge of the image is calculated according to the horizontal angle P of the pan-tilt and the field of view angle α, that is, $P_L=P-α/2$. Then the pan-tilt angle of the fire spot region is determined according to pan-tilt angle on the left edge of the image, the width W of the image, the height H of the image, and the position (x, y) of the fire spot region in the image, that is, $P_{fire}=P_L+x/W*α=P-(W/2-x)*α/W$.

After the pan-tilt angle of the fire spot region is determined, longitude and latitude information of the fire spot region can be determined by a combination of the pan-tilt angle of the fire spot region, longitude and latitude information of pan-tilt camera installation, and object distance information from the fire spot region to the pan-tilt camera. The object distance information from the fire spot region to the pan-tilt camera can be determined according to the position of the focus motor when the frame of image is collected, and object distance information of the fire spot can be obtained according to the relationship between the calibration position of the focus motor and the object distance. After precise positioning of the fire spot region, position information is sent to the control center for fire spot alarm.

In this embodiment of the present application, determining the position of the focus motor based on the minimum object distance and the maximum object distance in an image enables detection of the maximum range of fire spots with multiple object distances in a collected image. Secondly, after a suspected fire spot region in the image is determined, a search is performed between the closest position and the farthest position of the focus motor corresponding to the current image so that the suspected fire spot region in the image can be focused clearly. In this manner, the suspected fire spot region is detected in the image at multiple object distances, and the accuracy of detecting fire spots is improved. After a fire spot region is detected, the accurate position of the fire spot can be precisely positioned without using additional distance measuring means so that the efficiency of blocking and handling fires is improved. In this embodiment of the present application, the thermal imaging camera, during cruise scanning, can detect fire spots at different object distances in a multi-object-distance scene, thereby improving the accuracy of detecting fire spots.

Embodiment Three

Figure 8:
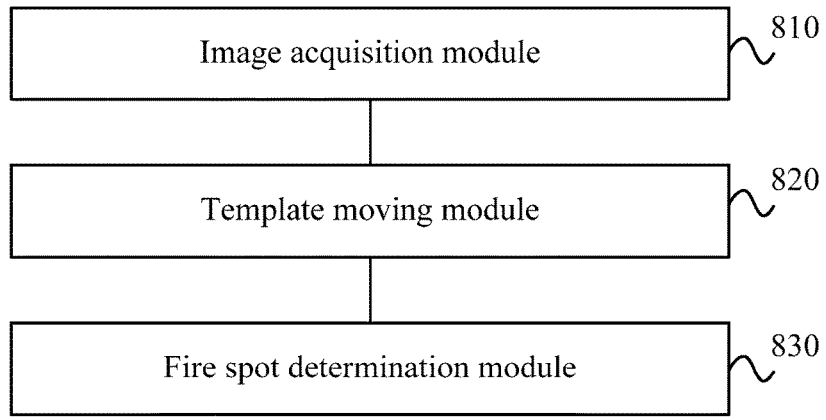
FIG. 8 is a diagram illustrating the structure of an apparatus for detecting fire spots according to embodiment three of the present application.

FIG. 8 is a diagram illustrating the structure of an apparatus for detecting fire spots according to embodiment three of the present application. This embodiment can be applied to fire spot detection in a multi-object-distance scene. As shown in FIG. 8, the apparatus includes an image acquisition module 810, a template moving module 820, and a fire spot determination module 830.

The image acquisition module 810 is configured to acquire a to-be-detected image collected by an image collection device based on a focus lens group at a target position. The target position of the focus lens group is determined according to the minimum object distance and the maximum object distance in the to-be-detected image.

The template moving module 820 is configured to move, according to a preset moving rule, a fire spot detection template in the to-be-detected image, and use the range covered by the fire spot detection template as a detection region.

The fire spot determination module 830 is configured to determine, according to the pixel value in the detection region, whether the detection region is a fire spot region.

In this embodiment of the present application, a target position of the focus lens group is determined based on the minimum object distance and the maximum object distance in a collected image, and a to-be-detected image is collected based on the target position. A detection region is determined by a moving result of a fire spot detection template in the to-be-detected image, and whether the detection region is a fire spot region is determined based on the pixel value of the detection region. The target position of the focus lens group is determined according to the object distance in the collected image so that using the focus lens group at the target position can achieve maximum detection clarity at the current object distance, thereby ensuring that in a multi-object-distance scene, fire spots with multiple object distances in the scene image can be detected, and the accuracy of detecting fire spots is improved.

Alternatively, the apparatus also includes a fire spot detection threshold determination module configured to perform the steps described below. Before determining, according to the pixel value in the detection region, whether the detection region is the fire spot region, a simulated image is acquired which is collected by the image collection device for a simulated fire spot based on the focus lens group at a simulated position, and the pixel value of a simulated fire spot region in which the simulated fire spot in the simulated image is located is determined. The simulated position of the focus lens group is determined according to an object distance between the simulated fire spot and the image collection device.

The pixel value of a non-simulated fire spot region in the simulated image is determined.

According to the pixel value of the simulated fire spot region and the pixel value of the non-simulated fire spot region, a first fire spot detection threshold and a second fire spot detection threshold are determined. The pixel value of the simulated fire spot region is greater than the first fire spot detection threshold. The first fire spot detection threshold is greater than the second fire spot detection threshold. The second fire spot detection threshold is greater than the pixel value of the non-simulated fire spot region.

Alternatively, the fire spot determination module includes a fire spot determination unit and a non-fire spot determination unit.

The fire spot determination unit is configured to determine that the detection region is a fire spot region in the case where the pixel value in the detection region is greater than or equal to the first fire spot detection threshold.

The non-fire spot determination unit is configured to determine that the detection region is not a fire spot region in the case where the pixel value in the detection region is less than the second fire spot detection threshold.

Alternatively, the fire spot determination module also includes a suspected fire spot determination unit and a second detection unit.

The suspected fire spot determination unit is configured to determine that the detection region is a suspected fire spot region in the case where the pixel value in the detection region is less than the first fire spot detection threshold and greater than equal to the second fire spot detection threshold.

The second detection unit is configured to perform a second detection on the suspected fire spot region to obtain a fire spot region in the suspected fire spot region.

Alternatively, the second detection unit performs a second detection on the suspected fire spot region to obtain a fire spot region in the suspected fire spot region in the following steps of determining the closest position of the focus lens group associated with the minimum object distance and the farthest position of the focus lens group associated with the maximum object distance in the to-be-detected image, moving the focus lens group from the closest position to the farthest position, collecting at least two images in a moving process, and determining that the target suspected fire spot region is a fire spot region in the case where the pixel value of a target suspected fire spot region in any one image of the at least two images is greater than or equal to the first fire spot detection threshold.

Alternatively, the second detection unit performs a second detection on the suspected fire spot region to obtain a fire spot region in the suspected fire spot region in the following steps of determining the number of the suspected fire spot regions in the to-be-detected image; and in the case where the number of the suspected fire spot regions is one, performing regional autofocus on the one suspected fire spot region, and determining the focus pixel value of the one suspected fire spot region in a focused image, and in the case where the focus pixel value is greater than equal to the first fire spot detection threshold, determining that the suspected fire spot region is a fire spot region.

Alternatively, the apparatus also includes an object distance calibration module configured to determine, before acquiring the to-be-detected image collected by the image collection device based on the focus lens group at the target position, at least two calibration positions of a focus lens group when an object of an image collection device is most clearly imaged at the at least two calibration object distances; and determine, according to the at least two calibration object distances and the at least two calibration positions of the focus lens group, the relationship between an object distance and a position of the focus lens group when an object is most clearly imaged.

Correspondingly, the image acquisition module includes a first determination unit of the motor target position, which is configured to perform the steps of determining, based on the relationship between the object distance and the position of the focus lens group, the closest position and the farthest position of an associated focus lens group respectively according to the minimum object distance and the maximum object distance in the to-be-detected image; and determining, according to the closest position and the farthest position of the focus lens group, a target position of the focus lens group.

Alternatively, the apparatus also includes a scanning path determination module configured to perform the steps of moving the position of the focus lens group to determine a first position and a second position of the focus lens group when the pixel value of the simulated fire spot region is the second fire spot detection threshold on a pixel value attenuation path in a moving process; determining, according to the first position and the second position of the focus lens group, a first object distance and a second object distance; determining, according to the first object distance and the second object distance, an object distance range of actual detection for detecting a fire spot in an image collected by the image collection device; and determining, according to the object distance range of actual detection, a scanning path of the image collection device to collect images.

Alternatively, the scanning path of the image collection device to collect the images includes at least two scanning inflection points. A lens of the image collection device is rotated in the vertical direction at each scanning inflection point. The apparatus also includes a pre-scanning module configured to perform the steps of acquiring a pre-scanned image after the image collection device is rotated in the vertical direction at the each scanning inflection point; and determining, according to the minimum object distance and the maximum object distance in the pre-scanned image, the closest position and the farthest position of the focus lens group when an object is clearly imaged, and establishing an association relationship between the each scanning inflection point and the closest position and the farthest position of the focus lens group.

Correspondingly, the image acquisition module includes a second determination unit of the motor target position, which is configured to perform the steps of determining a currently experienced scanning inflection point of the image collection device; determining, based on the association relationship between the each scanning inflection point of the at least two scanning inflection points and the closest position and the farthest position of the focus lens group, a current closest position and a current farthest position of the focus lens group according to the currently experienced scanning inflection point; and determining, according to the current closest position and the current farthest position, a target position of the focus lens group.

The apparatus for detecting fire spots which is provided in this embodiment of the present application may perform the method for detecting fire spots provided in any embodiment of the present application and has corresponding functional modules for implementing the method for detecting fire spots.

Embodiment Four

Figure 9:
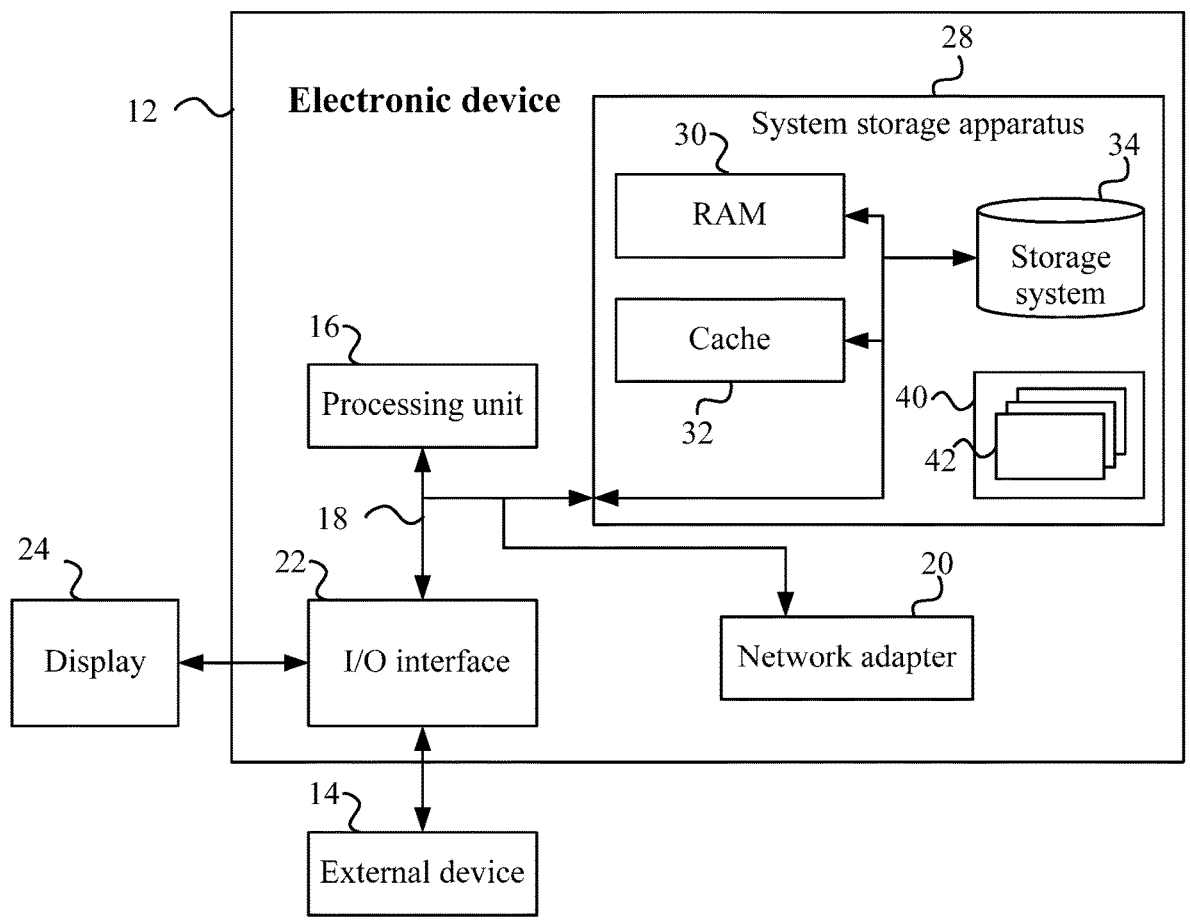
FIG. 9 is a diagram illustrating the structure of an electronic device according to embodiment four of the present application.

FIG. 9 is a diagram illustrating the structure of an electronic device according to embodiment four of the present application. FIG. 9 shows a block diagram of an example electronic device 12 suitable for implementing embodiments of the present application. The electronic device 12 shown in FIG. 9 is merely an example and not intended to limit the function and use scope of this embodiment of the present application.

As shown in FIG. 9, the electronic device 12 is represented in the form of a general-purpose computing device. Components of the electronic device 12 may include, but not limited to, at least one processor or processing unit 16, system storage apparatus 28, and a bus 18 connecting different system components (including the system storage apparatus 28 and the processing unit 16).

The bus 18 represents at least one type of several types of bus structures, including a storage apparatus bus or a storage apparatus controller, a peripheral bus, a graphics acceleration port, a processor, or a local bus using any one of multiple bus structures. For example, these architectures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The electronic device 12 typically includes multiple computer system readable media. These media can be any available media that can be accessed by the electronic device 12, including volatile and non-volatile media, and removable and non-removable media.

The system storage apparatus 28 may include a computer system readable medium in the form of a volatile storage apparatus, such as random access memory (RAM) 30 and/or cache storage apparatus 32. The electronic device 12 may also include other removable/non-removable, and volatile/non-volatile computer system storage media. By way of example only, a storage system 34 may be configured to read and write non-removable and non-volatile magnetic media (not shown in FIG. 9, commonly referred to as a "hard disk drive"). Although not shown in FIG. 9, a magnetic disk drive for reading and writing a removable non-volatile disk (such as, "floppy disk") and an optical disk drive for reading and writing a removable non-volatile disk (such as a compact disc read-only memory (CD-ROM), a digital video disc-read only memory (DVD-ROM, or other optical media) may be provided. In these cases, each drive may be connected to bus 18 via at least one data media interface. The storage apparatus 28 may include at least one program product having a group (for example, at least one) of program modules configured to perform functions of embodiments of the present application.

A program/utility 40 with a group (at least one) of program modules 42 may be stored, for example, in the storage apparatus 28. Such program modules 42 include, but are not limited to, an operating system, at least one application program, other program modules, and program data. Each or some combination of the examples may include an implementation of a network environment. The program module 42 generally performs functions and/or methods in embodiments of the present application.

The electronic device 12 may also communicate with at least one external device 14 (for example, a keyboard, a pointing apparatus, and a display 24). The electronic device 12 may also communicate with at least one device that enables a user to interact with the electronic device 12, and/or with any device (for example, a network card, and a modem) that enables the electronic device 12 to communicate with at least one other computing device. This communication may be performed via an input/output (I/O) interface 22. Moreover, the electronic device 12 may also communicate with at least more network (for example, a local area network (LAN), a wide area network (WAN), and/or a public network such as the Internet) via a network adapter 20. As shown in FIG. 9, the network adapter 20 communicates with other modules of the electronic device 12 via the bus 18. It should be noted that although not shown in FIG. 9, other hardware and/or software modules may be used in conjunction with the electronic device 12, which include, but are not limited to, a microcode, a device drive, a redundant processor, an external disk drive array, a redundant arrays of independent disks (RAID) system, a tape drive, and a data backup storage system.

The processing unit 16 executes programs stored in the storage apparatus 28 to perform function applications and data processing, for example, to implement the method for detecting fire spots provided by the embodiments of the present application. The implementation includes acquiring a to-be-detected image collected by an image collection device based on a focus lens group at a target position, where the target position of the focus lens group is determined according to the minimum object distance and the maximum object distance in the to-be-detected image; moving, according to a preset moving rule, a fire spot detection template in the to-be-detected image, and using the range covered by the fire spot detection template as a detection region; and determining, according to the pixel value in the detection region, whether the detection region is a fire spot region.

Embodiment Five

Embodiment five of the present application provides a non-transitory computer-readable storage medium storing a computer program that, when executed by a processor, performs the method for detecting fire spots provided in the present application. The method is performed in the following steps of acquiring a to-be-detected image collected by an image collection device based on a focus lens group at a target position, where the target position of the focus lens group is determined according to the minimum object distance and the maximum object distance in the to-be-detected image; moving, according to a preset moving rule, a fire spot detection template in the to-be-detected image, and using the range covered by the fire spot detection template as a detection region; and determining, according to the pixel value in the detection region, whether the detection region is a fire spot region.

The computer storage medium in this embodiment of the present application may adopt any combination of at least one computer-readable medium. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. More specific examples (a non-exhaustive list) of computer-readable storage media include an electrical connection having at least one wire, a portable computer disk, a hard disk, a random access memory (RAM), a read-only memory (ROM), an erasable programmable read-only memory (EPROM) or flash memory, an optical fiber, a portable compact disk read-only memory (CD-ROM), an optical storage device, a magnetic storage device, or any suitable combination thereof. In this document, a computer-readable storage medium may be any tangible medium containing or storing a program that may be used by or in conjunction with an instruction execution system, an apparatus, or a component.

The computer-readable signal medium may include a data signal carrying a computer-readable program code and propagating in a baseband or as part of a carrier wave. Such propagated data signals may take a variety of forms, including, but not limited to, an electromagnetic signal, an optical signal, or any suitable combination thereof. The computer-readable signal medium may also be any computer-readable medium other than a computer-readable storage medium. The computer-readable medium may send, propagate, or transmit programs for use by or in conjunction with an instruction execution system, an apparatus, or a component.

Program codes included on the computer-readable medium may be transmitted by any suitable medium including, but not limited to, a radio medium, a wire, an optical cable, radio frequency (RF), or any suitable combination thereof.

Computer program codes for performing the operations of the present application may be written in one or more programming languages or a combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

What is claimed is:

1. A method for detecting fire spots, comprising:
   acquiring a to-be-detected image collected by an image collection device based on a focus lens group at a target position; wherein the target position of the focus lens group is determined according to a minimum object distance and a maximum object distance in the to-be-detected image;
   moving, according to a preset moving rule, a fire spot detection template in the to-be-detected image, and using a range covered by the fire spot detection template as a detection region; and
   determining, according to a pixel value in the detection region, whether the detection region is a fire spot region;
   wherein before determining, according to the pixel value in the detection region, whether the detection region is the fire spot region, the method further comprises:
   acquiring a simulated image collected by the image collection device for a simulated fire spot based on the focus lens group at a simulated position, and determining a pixel value of a simulated fire spot region in which the simulated fire spot in the simulated image is located; wherein the simulated position of the focus lens group is determined according to an object distance between the simulated fire spot and the image collection device;
   determining a pixel value of a non-simulated fire spot region in the simulated image; and
   determining, according to the pixel value of the simulated fire spot region and the pixel value of the non-simulated fire spot region, a first fire spot detection threshold and a second fire spot detection threshold; wherein the pixel value of the simulated fire spot region is greater than the first fire spot detection threshold, the first fire spot detection threshold is greater than the second fire spot detection threshold, and the second fire spot detection threshold is greater than the pixel value of the non-simulated fire spot region.

2. The method of claim 1, wherein determining, according to the pixel value in the detection region, whether the detection region is the fire spot region, comprises:
   determining that the detection region is a fire spot region in a case where the pixel value in the detection region is greater than or equal to the first fire spot detection threshold; and
   determining that the detection region is not a fire spot region in a case where the pixel value in the detection region is less than the second fire spot detection threshold.

3. The method of claim 2, wherein determining, according to the pixel value in the detection region, whether the detection region is the fire spot region, further comprises:
   determining that the detection region is a suspected fire spot region in a case where the pixel value in the detection region is less than the first fire spot detection threshold and greater than or equal to the second fire spot detection threshold; and
   performing a second detection on the suspected fire spot region to obtain a fire spot region in the suspected fire spot region.

4. The method of claim 3, wherein performing the second detection on the suspected fire spot region to obtain the fire spot region in the suspected fire spot region, comprises:
- determining a closest position of the focus lens group associated with the minimum object distance and a farthest position of the focus lens group associated with the maximum object distance in the to-be-detected image, moving the focus lens group from the closest position to the farthest position, collecting at least two images in a moving process, and determining that a target suspected fire spot region is a fire spot region in a case where a pixel value of the target suspected fire spot region in one image of the at least two images is greater than or equal to the first fire spot detection threshold.

5. The method of claim 3, wherein performing the second detection on the suspected fire spot region to obtain the fire spot region in the suspected fire spot region, comprises:
- determining a number of the suspected fire spot region in the to-be-detected image; and
- in a case where one suspected fire spot region exists, performing regional autofocus on the suspected fire spot region, and determining a focus pixel value of the suspected fire spot region in a focused image, and in a case where the focus pixel value is greater than or equal to the first fire spot detection threshold, determining that the suspected fire spot region is a fire spot region.

6. The method of claim 1, wherein before acquiring the to-be-detected image collected by the image collection device based on the focus lens group at the target position, the method further comprises:
- determining at least two calibration positions of the focus lens group when object imaging of the image collection device is the clearest at at least two calibration object distances; and
- determining, according to the at least two calibration object distances and the at least two calibration positions of the focus lens group, a relationship between an object distance and a position of the focus lens group when the object imaging of the image collection device is the clearest;
- and wherein determining the target position of the focus lens group according to the minimum object distance and the maximum object distance in the to-be-detected image, comprises:
- determining, based on the relationship between the object distance and the position of the focus lens group, a closest position and a farthest position of an associated focus lens group respectively according to a minimum object distance and a maximum object distance in the to-be-detected image; and
- determining, according to the closest position and the farthest position of the focus lens group, a target position of the focus lens group.

7. The method of claim 1, further comprising:
- moving a position of the focus lens group to determine a first position and a second position of the focus lens group when the pixel value of the simulated fire spot region is the second fire spot detection threshold on a pixel value attenuation path in a moving process;
- determining, according to the first position and the second position of the focus lens group, a first object distance and a second object distance;
- determining, according to the first object distance and the second object distance, an object distance range of actual detection for detecting a fire spot in an image collected by the image collection device; and
- determining, according to the object distance range of actual detection, a scanning path of the image collection device to collect images.

8. The method of claim 7, wherein the scanning path of the image collection device to collect the images comprises at least two scanning inflection points, a lens of the image collection device is rotated in a vertical direction at each scanning inflection point of the at least two scanning inflection points, and the method further comprises:
- acquiring a pre-scanned image after the image collection device is rotated in the vertical direction at each scanning inflection point; and
- determining, according to a minimum object distance and a maximum object distance in the pre-scanned image, a closest position and a farthest position of the focus lens group when the object imaging of the image collection device is the clearest, and establishing an association relationship between each scanning inflection point and the closest position and the farthest position of the focus lens group;
- and wherein determining the target position of the focus lens group according to the minimum object distance and the maximum object distance in the to-be-detected image, comprises:
- determining a currently experienced scanning inflection point of the image collection device;
- determining, based on the association relationship between each scanning inflection point of the at least two scanning inflection points and the closest position and the farthest position of the focus lens group, a current closest position and a current farthest position of the focus lens group according to the currently experienced scanning inflection point; and
- determining, according to the current closest position and the current farthest position, a target position of the focus lens group.

9. An electronic device, comprising:
- at least one processor and
- a storage apparatus configured to store at least one program;
- wherein the at least one program, when executed by the at least one processor, causes the at least one processor to perform:
- acquiring a to-be-detected image collected by an image collection device based on a focus lens group at a target position; wherein the target position of the focus lens group is determined according to a minimum object distance and a maximum object distance in the to-be-detected image;
- moving, according to a preset moving rule, a fire spot detection template in the to-be-detected image, and using a range covered by the fire spot detection template as a detection region; and
- determining, according to a pixel value in the detection region, whether the detection region is a fire spot region;
- wherein the at least one program, when executed by the at least one processor, further causes the at least one processor to perform:
- acquiring a simulated image collected by the image collection device for a simulated fire spot based on the focus lens group at a simulated position, and determining a pixel value of a simulated fire spot region in which the simulated fire spot in the simulated image is located; wherein the simulated position of the focus lens group is determined according to an object distance between the simulated fire spot and the image collection device;

determining a pixel value of a non-simulated fire spot region in the simulated image; and determining, according to the pixel value of the simulated fire spot region and the pixel value of the non-simulated fire spot region, a first fire spot detection threshold and a second fire spot detection threshold; wherein the pixel value of the simulated fire spot region is greater than the first fire spot detection threshold, the first fire spot detection threshold is greater than the second fire spot detection threshold, and the second fire spot detection threshold is greater than the pixel value of the non-simulated fire spot region.

10. A non-transitory computer-readable storage medium, which is configured to store a computer program that, when executed by a processor, performs:

acquiring a to-be-detected image collected by an image collection device based on a focus lens group at a target position; wherein the target position of the focus lens group is determined according to a minimum object distance and a maximum object distance in the to-be-detected image;

moving, according to a preset moving rule, a fire spot detection template in the to-be-detected image, and using a range covered by the fire spot detection template as a detection region; and determining, according to a pixel value in the detection region, whether the detection region is a fire spot region;

wherein the computer program, when executed by the processor, further performs:

acquiring a simulated image collected by the image collection device for a simulated fire spot based on the focus lens group at a simulated position, and determining a pixel value of a simulated fire spot region in which the simulated fire spot in the simulated image is located; wherein the simulated position of the focus lens group is determined according to an object distance between the simulated fire spot and the image collection device;

determining a pixel value of a non-simulated fire spot region in the simulated image; and determining, according to the pixel value of the simulated fire spot region and the pixel value of the non-simulated fire spot region, a first fire spot detection threshold and a second fire spot detection threshold; wherein the pixel value of the simulated fire spot region is greater than the first fire spot detection threshold, the first fire spot detection threshold is greater than the second fire spot detection threshold, and the second fire spot detection threshold is greater than the pixel value of the non-simulated fire spot region.

11. The electronic device of claim 9, wherein determining, according to the pixel value in the detection region, whether the detection region is the fire spot region, comprises:

determining that the detection region is a fire spot region in a case where the pixel value in the detection region is greater than or equal to the first fire spot detection threshold; and determining that the detection region is not a fire spot region in a case where the pixel value in the detection region is less than the second fire spot detection threshold.

12. The electronic device of claim 11, wherein determining, according to the pixel value in the detection region, whether the detection region is the fire spot region, further comprises:

determining that the detection region is a suspected fire spot region in a case where the pixel value in the detection region is less than the first fire spot detection threshold and greater than or equal to the second fire spot detection threshold; and performing a second detection on the suspected fire spot region to obtain a fire spot region in the suspected fire spot region.

13. The electronic device of claim 12, wherein performing the second detection on the suspected fire spot region to obtain the fire spot region in the suspected fire spot region, comprises:

determining a closest position of the focus lens group associated with the minimum object distance and a farthest position of the focus lens group associated with the maximum object distance in the to-be-detected image, moving the focus lens group from the closest position to the farthest position, collecting at least two images in a moving process, and determining that a target suspected fire spot region is a fire spot region in a case where a pixel value of the target suspected fire spot region in one image of the at least two images is greater than or equal to the first fire spot detection threshold.

14. The electronic device of claim 12, wherein performing the second detection on the suspected fire spot region to obtain the fire spot region in the suspected fire spot region, comprises:

determining a number of the suspected fire spot region in the to-be-detected image; and in a case where one suspected fire spot region exists, performing regional autofocus on the suspected fire spot region, and determining a focus pixel value of the suspected fire spot region in a focused image, and in a case where the focus pixel value is greater than or equal to the first fire spot detection threshold, determining that the suspected fire spot region is a fire spot region.

15. The electronic device of claim 9, wherein the at least one program, when executed by the at least one processor, causes the at least one processor to perform:

determining at least two calibration positions of the focus lens group when object imaging of the image collection device is the clearest at at least two calibration object distances; and determining, according to the at least two calibration object distances and the at least two calibration positions of the focus lens group, a relationship between an object distance and a position of the focus lens group when the object imaging of the image collection device is the clearest;

and wherein determining the target position of the focus lens group according to the minimum object distance and the maximum object distance in the to-be-detected image, comprises:

determining, based on the relationship between the object distance and the position of the focus lens group, a closest position and a farthest position of an associated focus lens group respectively according to a minimum object distance and a maximum object distance in the to-be-detected image; and determining, according to the closest position and the farthest position of the focus lens group, a target position of the focus lens group.

16. The electronic device of claim 9, wherein the at least one program, when executed by the at least one processor, causes the at least one processor to perform:

moving a position of the focus lens group to determine a first position and a second position of the focus lens group when the pixel value of the simulated fire spot region is the second fire spot detection threshold on a pixel value attenuation path in a moving process;

determining, according to the first position and the second position of the focus lens group, a first object distance and a second object distance;

determining, according to the first object distance and the second object distance, an object distance range of actual detection for detecting a fire spot in an image collected by the image collection device; and determining, according to the object distance range of actual detection, a scanning path of the image collection device to collect images.

17. The electronic device of claim 16, wherein the scanning path of the image collection device to collect the images comprises at least two scanning inflection points, a lens of the image collection device is rotated in a vertical direction at each scanning inflection point of the at least two scanning inflection points, and the at least one program, when executed by the at least one processor, causes the at least one processor to perform:

acquiring a pre-scanned image after the image collection device is rotated in the vertical direction at each scanning inflection point; and determining, according to a minimum object distance and a maximum object distance in the pre-scanned image, a closest position and a farthest position of the focus lens group when object imaging of the image collection device is the clearest, and establishing an association relationship between each scanning inflection point and the closest position and the farthest position of the focus lens group;

and wherein determining the target position of the focus lens group according to the minimum object distance and the maximum object distance in the to-be-detected image, comprises:

determining a currently experienced scanning inflection point of the image collection device;

determining, based on the association relationship between each scanning inflection point of the at least two scanning inflection points and the closest position and the farthest position of the focus lens group, a current closest position and a current farthest position of the focus lens group according to the currently experienced scanning inflection point; and determining, according to the current closest position and the current farthest position, a target position of the focus lens group.

\* \* \* \* \*